United States Patent [19]

Johnson et al.

[11] Patent Number: 4,921,558

[45] Date of Patent: May 1, 1990

[54] POLY(ARYLENE SULFIDE) COMPOSITES

[75] Inventors: Timothy W. Johnson; Don G. Brady, both of Bartlesville, Okla.

[73] Assignee: Phillips Petroleum Company, Bartlesville, Okla.

[21] Appl. No.: 301,966

[22] Filed: Jan. 26, 1989

Related U.S. Application Data

[62] Division of Ser. No. 121,494, Nov. 16, 1987.

[51] Int. Cl.$^5$ ................................ C08K 3/20
[52] U.S. Cl. ........................ 156/181; 156/180; 156/161; 156/166; 156/242; 156/243; 264/136; 264/174; 264/331.11; 427/180; 427/195; 428/113; 428/294; 428/408; 428/419; 524/609; 525/189; 525/537
[58] Field of Search ............ 156/166, 180, 181; 427/180, 195; 264/136, 174, 331.11; 524/496, 609; 523/222; 428/294, 113, 408, 419; 525/189, 537

[56] References Cited

U.S. PATENT DOCUMENTS

| | | | |
|---|---|---|---|
| 3,988,286 | 10/1976 | Edmonds, Jr. et al. | 260/37 |
| 4,026,863 | 5/1977 | Iseki et al. | 525/189 |
| 4,075,158 | 2/1978 | Cook | 525/189 |
| 4,134,874 | 1/1979 | Needham | 260/37 |
| 4,355,059 | 10/1982 | Blackwell | 427/388.2 |
| 4,395,512 | 7/1983 | Kubota et al. | 524/413 |
| 4,489,129 | 12/1984 | Shue et al. | 428/366 |
| 4,493,917 | 1/1985 | Bailleux et al. | 525/189 |
| 4,544,700 | 10/1985 | Wright | 524/543 |
| 4,678,831 | 7/1987 | Kawabata et al. | 524/496 |
| 4,680,326 | 7/1987 | Leland et al. | 524/106 |
| 4,690,972 | 9/1987 | Johnson et al. | 524/609 |
| 4,703,081 | 10/1987 | Blackwell et al. | 524/592 |

FOREIGN PATENT DOCUMENTS

| | | | |
|---|---|---|---|
| 0125472 | 11/1984 | European Pat. Off. | |
| 142825 | 5/1985 | European Pat. Off. | 525/189 |
| 0228268 | 7/1987 | European Pat. Off. | |
| 55-82129 | 6/1980 | Japan . | |
| 59-191761 | 10/1984 | Japan . | |
| 61-285256 | 12/1986 | Japan . | |

*Primary Examiner*—John C. Bleutge
*Assistant Examiner*—David W. Woodward
*Attorney, Agent, or Firm*—Laney, Dougherty, Hessin & Beavers

[57] ABSTRACT

Poly(arylene sulfide)/long carbon fiber laminates containing small amounts of added crack inhibiting agent such as polyethylene have reduced levels of microcracking. The polyethylene can be introduced as a finely divided powder in a slurry prepreg process or can be compounded with the poly(arylene sulfide) and extruded as a film for stacking with carbon fabric.

5 Claims, No Drawings

POLY(ARYLENE SULFIDE) COMPOSITES

This is a divisional of a co-pending application Ser. No. 121,494 filed on Nov. 16, 1987.

BACKGROUND

In one aspect, this invention relates to a poly(arylene sulfide) composite composition. In another aspect, this invention relates to process for forming a poly(arylene sulfide) composite composition. In yet another aspect, this invention relates to incorporating additives into a fiber-reinforced poly(arylene sulfide) composition.

Reinforced poly(arylene sulfide) compositions are highly suitable for forming into a variety of objects. Fibers are generally used to reinforce such compositions. Fibers commonly used for glass fibers, carbon fibers, and aramid fibers. Some fibers present special problems because they exhibit anisotropic thermal expansion. With increasing temperatures, carbon fibers for example expand negligibly in the longitudinal direction but have substantial diametrical expansion. When carbon fibers are utilized to reinforce poly(arylene sulfide) compositions, temperature cycling causes microcracking in the resin matrix because of the differing temperature expansion between the carbon fiber and the resin matrix. This microcracking is noticed particularly in cross ply, quasi-isotropic and fabric laminates since stresses are set up between adjacent groups of fibers which are nonparallel.

Where long carbon fibers are used to reinforce a poly(arylene sulfide) matrix, microcracks extending from the carbon fibers into the matrix provide an avenue for liquid absorption due to capillary action which can cause further deterioration in composite strength.

The mechanism of crack formation in long carbon fiber reinforced poly(arylene sulfide) compositions is different from crack formation in poly(arylene sulfide) injection molding compounds which can be reinforced with short fibers, generally having a length of 1 cm or less. In injection molding compounds, the cracks are caused because poly(arylene sulfide) resins shrink upon solidification and solidification occurs first on the outside surface of injection molded objects. The resin on the inside of an injection molded object solidifies last and occupies a lesser volume than is required to fill the volume previously determined by the outside surfaces of the object. The solidifying innermost resin pulls apart from the previously solidified outermost resin, resulting in cracks. The problem is especially acute in thick walled injection molded objects having a wall thickness of greater than 1 cm, for example.

On the other hand, composite lay-ups formed from a poly(arylene sulfide), such as polyphenylene sulfide (PPS) and long carbon fiber unidirectional prepreg display microcracking, particularly in cross ply and quasi-isotropic lay-ups. These microcracks are observable by cutting the laminate, polishing the cut surface and observing the surface microscopically by direct reflected light. The microcracks are typically up to a few microns wide and extend through the thickness of the ply. This may cause reduced strength in the composite and/or increased sensitivity to property-deteriorating fluids.

OBJECTS OF THE INVENTION

It is an object of this invention to reduce microcracking in poly(arylene sulfide) matrices which are reinforced with long carbon fibers.

It is another object of this invention to provide a process for incorporating crack inhibiting agents into a poly(arylene sulfide) resin suitable for using as a matrix material with long carbon fiber reinforcement.

It is yet another object of this invention to provide a carbon fiber reinforced composition characterized by low levels of microcracking.

SUMMARY OF THE INVENTION

In one embodiment, the invention comprises a continuous poly(arylene sulfide) resin matrix which contains long carbon fiber reinforcement. A polymeric crack inhibiting agent is dispersed in the matrix to inhibit the formation and/or propagation of microcracks. The inventive composition is especially well suited to produce laminates containing regions of unidirectionally oriented long carbon fiber reinforcement in proximity to another region of fibers oriented perpendicular to those in the first region, since mutually perpendicular orientation of carbon fibers exacerbates thermally induced stresses, and crack propagation is exacerbated where the fibers are positioned parallel to one another.

In another embodiment of the invention, there is provided a process for increasing the microcracking resistance of a carbon fiber reinforced poly(arylene sulfide) resin matrix. According to this embodiment of the invention, a polymeric crack inhibiting agent is dispersed throughout the resin matrix. Preferably, the poly(arylene sulfide) resin is mixed with particles of the crack inhibiting agent in powder form, the mixture is heated to above the softening point of the poly(arylene sulfide) resin and sufficient pressure is applied to thus heated mixture to consolidate the resin and form an article having a continuous poly(arylene sulfide) resin matrix with polymeric crack inhibiting agent dispersed throughout.

In a further preferred embodiment of the invention, particles of the poly(arylene sulfide) resin are mixed with the particles of a second polymer constituting the polymeric crack inhibiting agent by preparing an aqueous slurry of the two particles, agitating the slurry, and pulling at least one roving of carbon fibers through the slurry in such a manner as to pick up a mixture of the particles of the poly(arylene sulfide) resin and the second polymer and form an impregnated wet roving which is then at least partially dried and pulled through a dye to form the continuous resin matrix. Articles formed according to this process contain aligned carbon fiber and are capable of being laminated together and/or thermoformed into desired shapes.

DETAILED DESCRIPTION OF THE INVENTION

The composition of the invention comprises a continuous thermoplastic resin matrix, long carbon fiber reinforcement embedded in the matrix, and a polymeric crack inhibiting agent dispersed throughout the matrix in an amount sufficient to mitigate microcracking.

The continuous thermoplastic resin matrix is preferably a poly(arylene) resin. The most preferred polyarylene resins contain monosulfide linkages and are preferably poly(arylene sulfide) (hereinafter PAS) resins. Suitable PAS resin is preferably selected from the group consisting of poly(phenylene sulfide), (hereinafter PPS); poly(arylene sulfide ketone), (hereinafter PASK), preferably poly(phenylene sulfide phenylene ketone); poly(arylene sulfide sulfone) (hereinafter PASS), preferably poly(phenylene sulfide phenylene sulfone) and poly(biphenylene sulfide) (hereinafter PBPS). Preferred PAS resins will generally have a softening point in the range of from about 250° C. to about 450° C. and will have a melt flow in the range of from near zero up to about 400 grams/10 minutes. Highly useful materials will exhibit a melt flow in the range of from about 5 to about 200 grams/10 minutes (ASTM D1238).

A wide variety of materials may suitably be used as the crack inhibiting agent. The crack inhibiting agent should be dispersed throughout the poly(arylene sulfide) resin matrix in a finally divided form. The crack inhibiting agent is preferably in the form of finely divided polymeric substances, most preferably in powdered form, generally having a particle size of smaller than about 50 microns. In one embodiment, these particles can be characterized as having a cross-sectional dimension such that at least 90%, based on the number of particles, can pass through a 50 micron filter. It is not necessary, however, that the crack inhibiting agent be divided so finely as to be essentially dissolved in the poly(arylene sulfide) matrix. In an embodiment of the invention that has been used with good results, the powdered crack inhibiting agent can further be characterized as being constituted of particles having a cross-sectional dimensions such as to provide for retention of at least 90%, based on weight, on a 1 micron filter. In one embodiment of the invention, the crack inhibiting agent has an average particle size in range of from about 2 microns to about 20 microns. In this embodiment, the particles of the crack inhibiting agent are on the same order of size as the diameter of the carbon fibers with which the resin matrix is reinforced.

Most desirably, the crack inhibiting agent is in the form of a polymer which has a degradation temperature which is above the temperature at which the poly(arylene sulfide) resin matrix is processed. The processing temperature is generally a few degrees above the softening point of the resin. Suitable polymers from which the crack inhibiting agent can be selected are: polyethylene, polypropylene, poly-4-methyl-1-pentene, polyamides such as Nylon ® 6, Nylon 6,6, Nylon 11 or Nylon 12, polyesters such as polyethylene terephthalate or polybutylene terephthalate, polystyrene, styrene-acrylonitrile copolymers, polysulfone, polyether sulfone. Copolymers of these materials can be used as well. In a preferred embodiment, the crack inhibiting agent is selected from the group consisting of polyethylene, polypropylene and copolymers of polyethylene or polypropylene containing up to about 10 weight percent of other monomers. Suitable comonomers can be selected from poly α-olefins such as propylene, butene, hexane, octene or 4-methyl-1-pentene, acrylic acid, or methacrylic acid. Acid groups may be converted partially or altogether to a salt form, such as with sodium, ammonium, calcium or zinc ion. Ethylene polymers are most preferred. The most preferred ethylene polymers are high-density ethylene polymers, preferably having a density in the range from about 0.94 to about 0.97 grams/cc. Although the melt index of the selected ethylene polymer is not critical, the most preferred ethylene polymers will have a melt index in the range of from near 0 up to about 400 grams/10 minutes, preferably in the range of from about 2 to about 200 grams/10 minutes.

The carbon fibers used in the present invention can be selected from a wide variety of materials. Long carbon fibers are preferred. By long is meant carbon fibers having a length of at least 2 centimeters, preferably carbon fibers having an average length of at least ten centimeters. Continuous carbon fibers are most preferred. Such carbon fibers are preferably in the matrix in the form of individual rovings or bundles of carbon fibers or filaments. The individual filaments in the roving will typically have a diameter in the range of from about 4 to about 10 microns. Usually, each roving will contain on the order of 1,000 to about 12,000 filaments. The invention is also applicable to woven carbon fiber fabrics in which the individual filaments can be as specified above.

Generally from about 50% to about 80% of the composition of the invention will comprise carbon fibers, based on weight. Preferably, from about 55 to about 70% by weight of the inventive composition will comprise carbon fibers. The crack inhibiting agent is preferably present in an amount of from about 0.1 to about 10% by weight of the total composition. Preferably, in the range of from about 0.2 to about 5% by weight of the inventive composition based on weight of carbon fibers, poly(arylene sulfide) resin matrix, and crack inhibiting agent, will be present. The remainder of the composition is comprised of the PAS resin. Preferably, no more than about 5% by weight of the composition is formed from ingredients other than the long carbon fibers, the crack inhibiting agent, and the PAS resin. Most preferably, the remainder of the composition consists essentially of the PAS resin.

The crack inhibiting agent is dispersed throughout the continuous resin matrix. The long carbon fiber reinforcement is embedded in the matrix. Preferably, the individual fibers in the carbon fiber reinforcement are oriented generally parallel to one or more primary reinforcement axes in the article. In the case of rod, structural members such as I-beams, and tape, the primary reinforcement axis will conicide with the longitudinal axis of the article. For panels, there will generally be several reinforcement axes in the article. Where the panel is formed from fabric for example, two reinforcement axes oriented 90° to each other will usually be present. For panels containing laminated plies there will often also be multiple reinforcement axes separated by a 45° angle, for example, or 90° angles.

The ingredients of the invention composition can be brought together in a variety of manners. The most important criteria to be preserved is that the polymeric crack inhibiting agent be dispersed throughout the resin matrix in the final product.

As a starting point, a poly(arylene sulfide) resin can be supplied in any convenient form, such as a powder, a pellet or a sheet. The resin is mixed with particles of the polymeric crack inhibiting agent to form a mixture. If desired, the crack inhibiting agent can be compounded with the matrix precursor in a mixer or extruder and brought together with the carbon fiber in premixed form. For example, resin containing particles of the polymeric crack inhibiting agent can be provided in film form for stacking with carbon fabric. In another embodiment, pre-mixed resin and crack inhibiting agent are fed to a crosshead extruder into which there is also fed carbon fiber roving. In yet another embodiment, there is prepared an aqueous slurry of PAS particles further containing particles of the crack inhibiting agent and at least one roving of carbon fibers is drawn through the slurry. Where such slurry impregnation of the carbon fibers is employed it is desirable that the particles in the slurry have an average particle size up from about 2 microns to about 50 microns. Generally, from about 20 to about 500 parts by weight of the PAS is present in the slurry for each part by weight of the crack inhibiting agent. In a most preferred embodiment, the crack inhibiting agent is comprised of polymer particles which have a thermal degradation temperature above the softening temperature of the PAS particles. The slurry is agitated and surfactant is added if required in order to provided a uniform dispersion of the crack inhibiting agent. The carbon fibers are drawn through the slurry in such a manner as to pick up a mixture of the poly(arylene sulfide) and the second polymer particles from the slurry thus forming an impregnated wet roving which is then at least partially dried and pulled through a hot die. The temperature in the die is sufficiently high to soften the PAS matrix, generally from about 10° to 100° higher than the softening point of the PAS and the die is of sufficiently small cross-sectional dimension to apply sufficient pressure to the PAS particles to fuse same into a continuous resin matrix. The die preferably converges from entrance to exit.

Articles formed according to the invention will frequently be differentiated from injection molding articles by their dimensions as well as by the orientation and length of the contained carbon fibers. Long fiber reinforced composite articles will often have at least one dimension which is less than about 1 centimeter, frequently less than about 0.5 centimeters.

The invention is further illustrated by the following examples.

EXAMPLE I

Finely divided polyethylene, (Allied AC-6A low density polyethylene), was mixed at a ratio of 1 part to 50 of finely divided poly(phenylene sulfide) of flow rate 50 g/10 min. without air cure. It was then subjected to further grinding in an air mill to give thoroughly mixed particles in the range of 20 μm particle size. The resulting mixed powder was added with vigorous stirring to a dilute solution of nonionic ethoxylated octylphenol surfactant (Fisher scintillation surfactant) in water. The concentration of polyphenylene sulfide/polyethylene mixture in the resulting slurry was about 10%, and the concentration of surfactant was about 0.1% relative to total weight of the slurry.

Carbon fibers were then drawn through the stirred slurry, through a hot air oven and into a hot shaping die at about 650° F., to yield tape which was suitable for fabrication into multilayer laminates. The carbon fiber content of the tape was typically 60% and the tape thickness was 7 mils.

EXAMPLE II

Finely divided polyphenylene sulfide with melt flow 50 g/10 min., 5.1 kg, was added with vigorous stirring to a solution of 48 ml of nonionic surfactant, ethoxylated octylphenol, in 43 kg of water to form Part 1 of the impregnation slurry. A 307 g portion of an ethylene acrylic acid copolymer suspension, trade name Michem Prime 4990 was poured in a fine stream into 3 kg of vigorously stirred water to form Part 2 of the impregnation slurry. Part 2 was then added to Part 1 with stirring, and carbon fibers were drawn through the resulting slurry, hence through a drying oven and through a hot shaping die to yield a tape consisting of about 60% by weight of carbon fibers and 7 mils thickness.

EXAMPLE III

Samples were evaluated for microcracking in the following manner. Prepreg tape was seamed to form tapes which were 10″ long and 10″ wide. They were then stacked in an eight ply sequence with fiber orientations 0, 90, 0, 90, 90, 0, 90, 0, abbreviated $(0,90)_{2s}$, and the stack was molded in a 10″ mold at 625° C. for 4 minutes at contact pressure and 3 minutes at 150 psi. Thereupon the mold was transferred to a cold press and pressed at 150 psi during cooling. After removal from the press, the samples were annealed for 2 hours at 150° C. in a circulating air oven. The laminate thickness was 50–60 mils.

Thereupon strips of laminate about 1″ wide were cut from the laminate at an angle of 45° relative to the fiber orientation, potted in a low temperature cure epoxy, then cut with a low speed diamond saw and finally polished with a series of grits of decreasing size culminating in 1 μm diamond or 0.05 μm alumina. The polished surfaces were then examined under an optical microscope at magnification from 40–400X. Microcracks, when seen, were typically less than 3 μm wide and extended up to one ply width. The polyethylene-containing sample (Example I) contained substantially no microcracks, and the ethylene acrylic acid copolymer-containing sample (Example II) contained very few microcracks. In contrast, a control sample containing neither polyethylene nor ethylene acrylic acid copolymer, contained regularly spaced microcracks, 10–20 microcracks per centimeter.

It is believed that microcracks result from stresses induced in the cooling process due to the low coefficient of expansion of carbon fibers in the longitudinal direction and the relatively high coefficient of expansion of resin and fibers in the transverse direction. This results in transverse tensile stresses in each ply, which are greater than can be sustained by the carbon fiber resin interface. It is further believed that the beneficial effect of the polyethylene or ethylene acrylic acid polymer is to reduce stresses during cool down.

That which is claimed is:

1. A process for forming an article having a poly(arylene sulfide) resin matrix, long carbon fiber reinforcement embedded in the matrix and a crack inhibiting agent uniformly dispersed throughout the matrix in finely divided form comprising:
   (a) mixing particles of a poly(arylene sulfide) resin and particles of a crack inhibiting agent with a liquid carrier to form an aqueous polymer slurry, wherein the particles in said slurry have an average particle size in the range of from about 2 microns to about 50 microns and said slurry contains in the range of from about 20 to about 500 parts by weight of said poly(arylene sulfide) resin for each part by weight of said crack inhibiting agent and said crack inhibiting agent being selected from the group consisting of polyethylene, polypropylene, and copolymers of ethylene or propylene with up to about 10 percent by weight based on total copolymer weight of other monomers.
   (b) agitating said aqueous polymer slurry;
   (c) pulling at least one roving of carbon fibers having a length of at least two centimeters through said aqueous polymer slurry in such a manner as to pick up a mixture of particles of said poly(arylene sulfide) and said crack inhibiting agent from said slurry and form an impregnated wet roving;

(d) at least partially drying said impregnated wet roving to form an at least partially dried impregnated roving;

(e) pulling said at least partially dried impregnated roving through a die having a temperature sufficiently high to soften the poly(arylene sulfide) particles impregnated in the roving; and (f) applying sufficient pressure to fuse the poly(arylene sulfide) particles into a continuous resin matrix.

2. A process as in claim 1 wherein said poly(arylene sulfide) resin is selected from the group consisting of poly(phenylene sulfide), poly(biphenylene sulfide), poly(phenylene sulfide phenylene ketone) and poly(phenylene sulfide phenylene sulfone).

3. A process as in claim 1 wherein said poly(arylene sulfide) resin comprises poly(phenylene sulfide) and said crack inhibiting agent comprises polyethylene.

4. The process of claim 3 wherein said crack inhibiting agent has a density in the range of from about 0.94 to 0.97 grams per cubic centimeter, and an average particle size in the range of about 2 to about 20 microns.

5. The process of claim 4 wherein said crack inhibiting agent has a particle size on the same order as the diameter of said carbon fibers.

* * * * *

UNITED STATES PATENT AND TRADEMARK OFFICE
CERTIFICATE OF CORRECTION

PATENT NO. : 4,921,558
DATED : May 1, 1990
INVENTOR(S) : Timothy W. Johnson and Don G. Brady It is certified that error appears in the above-identified patent and that said Letters Patent is hereby corrected as shown below:

Column 1, line 18, delete the word "for" and substitute the word --are-- therefor;

Column 3, line 30, delete the word "dimensions" and substitute the word --dimension-- therefor;

Column 3, line 56, delete the word "hexane" and substitute the word --hexene-- therefor; and Column 6, line 64 (claim 1) delete the period at the end of the line and substitute a semicolon therefor.

Signed and Sealed this

Sixth Day of August, 1991

Attest:

HARRY F. MANBECK, JR.

*Attesting Officer*  *Commissioner of Patents and Trademarks*